(12) United States Patent
Ryu et al.

(10) Patent No.: US 7,799,462 B2
(45) Date of Patent: Sep. 21, 2010

(54) MIXTURE FOR ANODE OF IMPROVED ADHESIVE STRENGTH AND LITHIUM SECONDARY BATTERY CONTAINING THE SAME

(75) Inventors: Ji Heon Ryu, Seoul (KR); Eun Ju Lee, Daejeon (KR); Jaepil Lee, Daejeon (KR); Jeong Hee Choi, Busan (KR); Min Su Kim, Daejeon (KR); Youngjoon Shin, Daejeon (KR)

(73) Assignee: LG Chem, Ltd. (KR)

( * ) Notice: Subject to any disclaimer, the term of this patent is extended or adjusted under 35 U.S.C. 154(b) by 554 days.

(21) Appl. No.: 11/552,302

(22) Filed: Oct. 24, 2006

(65) Prior Publication Data

US 2007/0264571 A1  Nov. 15, 2007

(30) Foreign Application Priority Data

Oct. 26, 2005  (KR) ...................... 10-2005-0101019

(51) Int. Cl.
*H01M 4/62* (2006.01)
(52) U.S. Cl. .................... 429/232; 429/218.1; 429/209; 429/231.1; 429/231.8; 429/188
(58) Field of Classification Search ............. 429/218.1, 429/209, 232, 233, 231.8, 231.1, 188
See application file for complete search history.

(56) References Cited

U.S. PATENT DOCUMENTS

| 6,475,670 B1 * | 11/2002 | Ito ............................ 429/232 |
| 6,905,796 B2 * | 6/2005 | Ishida et al. ................ 429/209 |
| 2005/0221185 A1 * | 10/2005 | Sakata et al. ............. 429/231.8 |

FOREIGN PATENT DOCUMENTS

| JP | 04355056 | 12/1992 |
| JP | 2004-296108 | * 10/2004 |
| KR | 1020000056301 | 9/2000 |
| KR | 1020040067030 | 7/2004 |
| KR | 1020050014189 | 2/2005 |

* cited by examiner

*Primary Examiner*—Laura S Weiner
(74) *Attorney, Agent, or Firm*—Cantor Colburn LLP

(57) ABSTRACT

Provided is an anode mix for a secondary battery comprising an anode active material, a conductive material and a binder, wherein the anode mix contains 0.01 to 1.0% by weight of alumina having an average particle diameter of less than 1000 nm, based on the total weight of the mix, and a lithium secondary battery comprising the same. Therefore, the present invention can achieve increases in anode active material-conductive material adhesion and anode active material-current collector adhesion which are exerted by a binder, and ultimately can improve lifespan characteristics or cycle characteristics of the battery.

1 Claim, No Drawings

MIXTURE FOR ANODE OF IMPROVED ADHESIVE STRENGTH AND LITHIUM SECONDARY BATTERY CONTAINING THE SAME

FIELD OF THE INVENTION

The present invention relates to an anode mix having improved adhesive strength and a lithium secondary battery comprising the same. More specifically, the present invention relates to an anode mix for a secondary battery comprising an anode active material, a conductive material and a binder, wherein the anode mix contains 0.01 to 1.0% by weight of alumina having an average particle diameter of less than 1000 nm based on the total weight of the mix, and a lithium secondary battery comprising the same.

BACKGROUND OF THE INVENTION

Rapid expansion in use of portable electronic equipment such as notebook computers, mobile phones, camcorders and digital cameras has led to increased demand for secondary batteries having a high-energy density which are used as power sources for such electronic equipment and also demand for secondary batteries for electric vehicles (EVs). As a typical example of such secondary batteries, a lithium secondary battery comprises an anode of a carbonaceous material, a cathode of a lithium metal oxide, a separator of a polyolefin material and a non-aqueous electrolyte.

The electrode of the lithium secondary battery is generally fabricated by coating an electrode slurry on metal foil. In this connection, the electrode slurry is prepared by mixing an electrode mix, which is usually composed of an electrode active material for storage of energy, a conductive material for imparting electrical conductivity and a binder for binding the electrode foil with the conductive material, in a suitable solvent such as NMP (N-methyl-2-pyrrolidone).

Various kinds of materials are often added to lithium secondary batteries, depending upon desired purposes and applications. For example, inorganic materials may be typically added as such additives. The present invention achieves improvement in battery lifespan characteristics by adding a small amount of alumina having a specified particle diameter to a cathode mix.

In this regard, some prior arts, which employ alumina as an electrode component, will now be reviewed hereinafter.

Korean Patent Registration No. 508920 discloses a lithium-sulfur secondary battery utilizing elemental sulfur and sulfur-based compounds as a cathode active material, instead of lithium transition metal oxides. According to this technique, battery capacity and lifespan characteristics are improved via addition of 1 to 50% by weight of alumina having a particle size of less than 35000 nm, based on the total weight of the cathode mix. This patent states that desired improvement in battery performance due to addition of an additive cannot be obtained when alumina is added in an amount of less than 1% by weight.

Korean Patent Laid-open Publication No. 2005-14189 discloses a technique for decreasing capacity reduction and improving cycle characteristics upon charge/discharge of a lithium secondary battery, by adding 1 to 3% by weight of $Al_2O_3$ and 5 to 10% by weight of $LiCo_3$ to an anode active material composed of tin and carbon. This patent does not specifically describe a particle diameter of alumina ($Al_2O_3$) and just shows that addition of less than 1% by weight of alumina cannot result in increases of battery capacity.

Japanese Patent Registration No. 3245886 discloses a technique of decreasing performance deterioration of a battery due to the presence of the residual alkali upon high-temperature storage, which involves adding 0.002 to 0.2 moles of $SiO_2$, $Al_2O_3$ and the like to a cathode active material of $LiCoO_2$, based on 1 mole of the cathode active material, thereby decreasing an amount of residual alkali. This Japanese Patent does not specifically reveal a particle diameter of alumina used therein, and it is believed from working examples thereof that problems associated with deterioration of battery performance cannot be solved with addition of such additives below the above-specified content ranges. Further, this Japanese Patent also states that desired high-temperature storage characteristics are achieved with addition of such additives to a cathode active material, instead of an anode active material.

Korean Patent Laid-open Publication No. 2000-0056301 discloses a technique of alleviating non-uniformity of electrolyte distribution via addition of 1 to 5% by weight of a metal oxide, for example alumina to an anode mix, thereby improving decreasing occurrence of localized swelling and unreacted parts of an anode over charge/discharge cycles. Likewise, this Korean Patent also does not mention about a particle diameter of the metal oxide used therein and describes that absorption effects of the electrolyte solution are poor upon addition of less than 1% by weight of the metal oxide.

As discussed above, it can be seen that some of conventional arts have confirmed some desired effects via addition of alumina to electrodes and the like. However, according to these conventional arts, alumina is illustrated only as an example of metal oxides which are added to electrodes, or is used in conjunction with other materials. Further, none of those arts discloses technical details stemming from inherent properties of alumina itself related to the particle diameter.

Further, according to conventional arts, it is described that desired effects are exerted only when at least 1% by weight of alumina is added if it is used alone. However, when large quantities of additives, which are not electrode active materials that are directly responsible for absorption (intercalation) and desorption (deintercalation) of lithium ions in lithium secondary batteries, are added as described above, it is impossible to overcome the fundamental limitations associated with decreases in energy density of the batteries even though other general properties may be improved.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have discovered the facts that lifespan characteristics or charge/discharge cycle characteristics of a battery are significantly dependent upon adhesive strength between an electrode active material and conductive material and adhesive strength of the electrode active material to a current collector, and use of alumina having a predetermined particle diameter even in a trace amount results in remarkable improvement in lifespan characteristics or cycle characteristics of the battery, contrary to conventionally known or accepted ideas in the related art. The present invention has been completed based on these findings.

Therefore, it is an object of the present invention to provide an anode mix for a lithium secondary battery having improved lifespan characteristics or cycle characteristics via addition of a trace amount of alumina having a predetermined particle diameter.

It is another object of the present invention to provide a high-performance lithium secondary battery comprising the above-mentioned anode mix.

DETAILED DESCRIPTION OF PREFERRED EMBODIMENTS

In accordance with an aspect of the present invention, the above and other objects can be accomplished by the provision of an anode mix for a secondary battery comprising an anode active material, a conductive material and a binder, wherein the anode mix contains 0.01 to 1.0% by weight of alumina having an average particle diameter of less than 1000 nm, based on the total weight of the mix.

From the results obtained through experiments performed by the present inventors, it was confirmed that, when the average particle diameter of alumina is less than 1000 nm, addition of a trace amount, less than 1.0% by weight, of alumina leads to increases in adhesion between the anode active material and conductive material and adhesion between the anode active material and current collector, which are exerted by a binder, thereby improving lifespan characteristics or charge/discharge cycle characteristics of the battery, whereas the higher content of alumina exceeding 1.0% by weight leads to deterioration in adhesion between electrode components and lifespan or cycle characteristics of the battery. These findings are astonishing results which are beyond descriptions of the above-mentioned conventional arts as well as general ideas known or accepted in the art. Further, decreases in the battery energy density can be fundamentally prevented due to the use of a tiny amount of an additive.

Even though the mechanisms of how alumina having such a specified particle diameter range acts to exert the above-mentioned effects have not yet been fully elucidated, it is surmised that the presence of fine alumina particles on the surface of the anode active material facilitates adhesion between the active material and binder and adhesion between the active material and current collector, thereby enhancing adhesive strength therebetween, and alumina serves as a filler for the binder, resulting in increased mechanical strength of the binder and consequently inhibiting volumetric changes of the battery during charge/discharge processes.

The preferred particle diameter of alumina is less than 1000 nm, as discussed hereinbefore, and alumina having a particle diameter larger than 1000 nm does not improve mechanical strength of the binder due to poor miscibility therebetween, thus confirming that a particle diameter of more than 1000 nm leads to deterioration in adhesion of electrode active materials and lifespan or cycle characteristics thereof. Therefore, it is preferred to use alumina having a smaller particle diameter, particularly alumina having a particle diameter of 10 to 200 nm.

The preferred content of alumina is in a range of 0.01 to 1.0% by weight based on the total weight of the anode mix, as described above. If the content of alumina is excessively low, it is difficult to achieve improvement of desired effects due to addition thereof. Conversely, if the content of alumina is excessively high, a scarcity of the binder undesirably leads to decreased adhesion and poor lifespan characteristics or cycle characteristics. More preferably, the content of alumina is in a range of 0.05 to 0.5% by weight.

Any forms of alumina may be used as alumina for the present invention, as long as they meet the above specified requirements. For example, nano-sized, fumed alumina may also be used.

Hereinafter, details of an anode active material, a binder and conductive material, which are principal components constituting an anode mix of the present invention, will be provided.

As examples of the anode active materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, Group I, Group II and Group III elements of the Periodic Table of the Elements, halogens; $0 \leq x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

As examples of the binder that may be utilized in the present invention, mention may be made of polytetrafluoroethylene (PTFE), polyvinylidene fluoride (PVdF), cellulose, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives. Specific examples of commercially available conductive materials may include various acetylene black products (available from Chevron Chemical Company, Denka Singapore Private Limited and Gulf Oil Company), Ketjen Black EC series (available from Armak Company), Vulcan XC-72 (available from Cabot Company) and Super P (Timcal Co.).

Where appropriate, the filler may be optionally added as an ingredient to inhibit anode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

Anode is fabricated by mixing the thus-obtained anode mix in a dispersion solvent such as isopropyl alcohol, N-methyl pyrrolidone (NMP) or acetone to thereby prepare an electrode paste, and applying the paste to the surface of the current collector, followed by drying and compressing.

Uniform application of the paste of electrode materials to a metal material may be carried out by conventional methods known in the art or appropriate novel methods, taking into consideration characteristics of materials to be used. For example, preferably the electrode paste is distributed onto the current collector and is then uniformly dispersed thereon using a doctor blade. Where appropriate, distribution and dispersion of the electrode paste may also be performed by a single step. Further, application of the electrode paste may be carried out by a method selected from die casting, comma coating, screen printing and the like. Alternatively, application of the electrode paste may be carried out by molding the paste on a separate substrate and then binding it to the current collector via pressing or lamination.

Drying of the paste applied over the current collector is preferably carried out in a vacuum oven at 50 to 200° C. for 1 to 3 days.

As examples of materials for the anode current collector, which have suitable conductivity without causing chemical changes in the fabricated battery, mention may be made of copper, stainless steel, aluminum, nickel, titanium, sintered carbon, copper or stainless steel having a surface treated with carbon, nickel, titanium or silver, and aluminum-cadmium alloys. The anode current collector is generally fabricated to have a thickness of 3 to 500 μm. The anode current collector may also be fabricated to form fine irregularities on the surface thereof so as to reinforce adhesion to the anode active material. Further, the anode current collector may take various forms including films, sheets, foils, nets, porous structures, foams and non-woven fabrics.

Further, the present invention provides, as previously illustrated, a lithium secondary battery comprising an anode including an anode mix applied to a current collector.

The lithium secondary battery is comprised of an electrode assembly composed of a cathode and an anode, which are faced opposite to each other with a separator therebetween, and a non-aqueous electrolyte containing a lithium salt.

The cathode is, for example, fabricated by applying a cathode active material to a cathode current collector, followed by drying. The cathode may further optionally include other components such as conductive material and binder, and if desired, a filler, as described above.

The cathode current collector is generally fabricated to have a thickness of 3 to 500 μm. There is no particular limit to materials for the cathode current collector, so long as they have high conductivity without causing chemical changes in the fabricated battery. As examples of materials for the cathode current collector, mention may be made of stainless steel, aluminum, nickel, titanium, sintered carbon, and aluminum or stainless steel which was surface-treated with carbon, nickel, titanium or silver. The cathode current collector may be fabricated to have fine irregularities on the surface thereof so as to enhance adhesion to the cathode active material. In addition, the cathode current collector may take various forms including films, sheets, foils, nets, porous structures, foams and non-woven fabrics.

Examples of the cathode active materials that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

Details of the binder and conductive material, and filler which is optionally added if necessary are the same as in the anode.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics, or kraft papers made of an olefin polymer such as polypropylene and/or glass fibers or polyethylene, which have chemical resistance and hydrophobicity, are used. Typical examples of commercially available products for the separator may include Celgard series such as Celgard™ 2400 and 2300 (available from Hoechest Celanese Corp.), polypropylene separators (available from Ube Industries Ltd., or Pall RAI Co.) and polyethylene series (available from Tonen or Entek).

Where appropriate, a gel polymer electrolyte may be coated on the separator to increase battery stability. Representative examples of the gel polymer may include polyethylene oxide, polyvinylidene fluoride and polyacrylonitrile.

When a solid electrolyte such as a polymer is employed as the electrolyte, the solid electrolyte may also serve as both the separator and electrolyte.

The non-aqueous electrolyte containing a lithium salt is composed of a non-aqueous electrolyte and lithium. As the non-aqueous electrolyte, a non-aqueous electrolytic solution, organic solid electrolyte and inorganic solid electrolyte may be utilized.

As examples of the non-aqueous electrolytic solution that can be used in the present invention, mention may be made of non-protic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy Franc, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

As examples of the inorganic solid electrolyte utilized in the present invention, mention may be made of nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following examples. These examples are provided only for illustrating the present invention and should not be construed as limiting the scope and spirit of the present invention.

Example 1

MCMB (mesocarbon microbead) as a graphitic anode active material, Super P as a conductive material and polyvinylidene fluoride as a binder were mixed in a weight ratio of 92:2:6, and 0.1% by weight of alumina ($Al_2O_3$) was added to the resulting mixture, based on the total weight of the mixture, followed by addition of NMP (N-methyl pyrrolidone), thereby preparing a slurry. Thereafter, the resulting anode slurry was applied to a copper current collector which was then dried in a vacuum oven at 120° C., thereby fabricating an anode. Alumina as used herein is aluminum oxide C having a particle size of 13 nm (available from Degussa). Adhesion of the thus-fabricated electrode was measured. The results thus obtained are given in Table 1 below.

In addition, $LiCoO_2$ as a cathode active material, Super-P as a conductive material and PVdF as a binder were mixed in a weight ratio of 92:4:4 (w/w) and were dispersed in NMP (N-methyl-2-pyrrolidone), and the resulting dispersion was coated on aluminum foil to fabricate a cathode.

Then, a porous separator made of polypropylene was interposed between the anode and cathode thus prepared as above, thereby fabricating an electrode assembly. The electrode assembly was placed in a pouch-type case to which electrode leads were then connected. Thereafter, as an electrolyte, a solution of ethylene carbonate (EC) and dimethyl carbonate (DMC) (1:1, v/v), in which 1 M $LiPF_6$ salt was dissolved, was injected thereto, followed by sealing the case to assemble a lithium secondary battery.

The thus-fabricated lithium secondary battery was subjected to charge/discharge in a voltage range of 3.0 to 4.2 V and lifespan characteristics of the battery were measured. The results thus obtained are also given in Table 1 below.

Example 2

A battery was fabricated in the same manner as in Example 1, except that 0.5% by weight of alumina was added, based on the total weight of an anode mix.

Example 3

A battery was fabricated in the same manner as in Example 1, except that 1% by weight of alumina was added, based on the total weight of an anode mix.

Comparative Example 1

A battery was fabricated in the same manner as in Example 1, except that 2% by weight of alumina was added based on the total weight of an anode mix.

Example 4

A battery was fabricated in the same manner as in Example 1, except that alumina having an average particle diameter of 400 nm was used.

Example 5

A battery was fabricated in the same manner as in Example 3, except that alumina having an average particle diameter of 400 nm was used.

Example 6

A battery was fabricated in the same manner as in Example 1, except that alumina having an average particle diameter of 1000 nm (1 μm) was used.

Example 7

A battery was fabricated in the same manner as in Example 3, except that alumina having an average particle diameter of 1000 nm (1 μm) was used.

Comparative Example 2

A battery was fabricated in the same manner as in Comparative Example 1, except that alumina having an average particle diameter of 400 nm was used.

Comparative Example 3

A battery was fabricated in the same manner as in Example 1, except that alumina having an average particle diameter of 2000 nm (2 μm) was used.

Comparative Example 4

A battery was fabricated in the same manner as in Example 3, except that alumina having an average particle diameter of 2000 nm (2 μm) was used.

Comparative Example 5

A battery was fabricated in the same manner as in Example 1, except that alumina having an average particle diameter of 10 μm was used.

Comparative Example 6

A battery was fabricated in the same manner as in Example 3, except that alumina having an average particle diameter of 10 μm was used.

Comparative Example 7

A battery was fabricated in the same manner as in Example 1, except that alumina was not added.

TABLE 1

| | Alumina particle size (nm) | Alumina content (wt %) | Adhesion (g) | Ratio of capacity at 200 cycles to initial capacity (%) |
|---|---|---|---|---|
| Ex. 1 | 13 | 0.1 | 45 | 90 |
| Ex. 2 | 13 | 0.5 | 42 | 88 |
| Ex. 3 | 13 | 1.0 | 33 | 74 |

TABLE 1-continued

| | Alumina particle size (nm) | Alumina content (wt %) | Adhesion (g) | Ratio of capacity at 200 cycles to initial capacity (%) |
|---|---|---|---|---|
| Comp. Ex. 1 | 13 | 2.0 | 27 | 66 |
| Ex. 4 | 400 | 0.1 | 39 | 82 |
| Ex. 5 | 400 | 1.0 | 37 | 80 |
| Comp. Ex. 2 | 400 | 2.0 | 29 | 68 |
| Ex. 6 | 1000 | 0.1 | 37 | 79 |
| Ex. 7 | 1000 | 1.0 | 35 | 77 |
| Comp. Ex. 3 | 2000 | 0.1 | 32 | 71 |
| Comp. Ex. 4 | 2000 | 1.0 | 31 | 70 |
| Comp. Ex. 5 | 10000 | 0.1 | 31 | 71 |
| Comp. Ex. 6 | 10000 | 1.0 | 30 | 70 |
| Comp. Ex. 7 | — | — | 30 | 70 |

As can be seen from Table 1, anode mixes to which alumina having a small particle diameter of 13 nm was added according to the present invention and secondary batteries comprising the same (Examples 1, 2 and 3) exhibited improvement in adhesion and consequently lifespan characteristics, as compared to no addition of alumina (Comparative Example 7). However, the battery of Comparative Example 1, to which 2% by weight of alumina was added, showed a decrease in adhesion due to an insufficient amount of a binder, thereby resulting in shortening of a battery lifespan.

Further, improved adhesion and lifespan were also confirmed in batteries of Examples 4 and 5 to which alumina having a particle diameter of 400 nm, relatively larger than in Example 1, was added, and in batteries of Examples 6 and 7 to which alumina having a particle diameter of 1000 nm was added. On the other hand, the battery of Comparative Example 2, to which 2% by weight of alumina was added, also showed decreased adhesion and deteriorated lifespan characteristics, similar to the battery of Comparative Example 1.

Meanwhile, due to an excessively large particle size of an alumina additive, batteries of Comparative Examples 3 and 4 to which alumina having a large particle diameter of 2 μm was added, and batteries of Comparative Examples 5 and 6 to which alumina having a large particle diameter of 10 μm was added, exhibited substantially no significant difference in adhesion and showed similar lifespan characteristics, as compared to the battery of Comparative Example 7 to which no alumina was added.

INDUSTRIAL APPLICABILITY

As apparent from the above description, constitution of an anode mix via addition of a small amount of nano-sized alumina according to the present invention leads to increases in anode active material-conductive material adhesion and anode active material-current collector adhesion which are exerted by the binder, and ultimately provides effects capable of improving lifespan characteristics or cycle characteristics of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A lithium secondary battery, comprising:
an electrode assembly composed of a cathode and an anode, which are disposed opposite with respect to each other and have a separator therebetween, and a non-aqueous electrolyte containing a lithium salt,
wherein an anode mix for the anode comprises an anode active material, a conductive material, a binder and 0.05 to 0.5% by weight of alumina having an average particle diameter of 10 to 400 nm, based on the total weight of the mix; and
a cathode active material for the cathode is a lithium transition metal oxide; and
the lithium salt is selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, a lithium chloroborate, a lithium lower aliphatic carboxylate, lithium tetraphenyl borate, and a lithium imide.

* * * * *